United States Patent Office 3,113,156
Patented Dec. 3, 1963

3,113,156
CHLORINATED SOLVENTS STABILIZED WITH MIXTURE OF A DIOXOLANE COMPOUND AND A NITROALIPHATIC COMPOUND
Leslie L. Sims, Baton Rouge, La., assignor to Ethyl Corporation, New York, N.Y., a corporation of Virginia
No Drawing. Filed May 27, 1960, Ser. No. 32,107
18 Claims. (Cl. 260—652.5)

This invention relates to chlorinated solvents, and particularly to new and highly effective stabilized solvent compositions composed of chlorinated hydrocarbons containing mixtures of stabilizing additives, said compositions being particularly suitable for the liquid and vapor phase degreasing of metals.

Chlorinated aliphatic hydrocarbons are useful as solvents for the degreasing of metals, for dry cleaning and for many other purposes. Such solvents are particularly useful in the degreasing of metals because of their low flammability and high solvency for oils and greases. Among the most widely used of these solvents are carbon tetrachloride, ethylene dichloride, trichloroethylene and perchloroethylene. Unfortunately, however, chlorinated aliphatic hydrocarbons in general attack and cause corrosion of metallic surfaces upon contact therewith. Such attacks, which also decompose the chlorinated aliphatic hydrocarbon, occur with surprising rapidity, especially at elevated temperatures.

A highly desirable chlorinated hydrocarbon is methyl chloroform, or 1,1,1-trichloroethane, which is known to have exceptionally good solvency powers and other highly desirable properties, particularly for metal cleaning operations. Very unfortunately, however, this particular solvent also exhibits an aggravated tendency to decompose and concurrently attack metals, both at ambient or storage conditions, and at elevated temperatures suitable for cleaning operations. The reason for this marked inadequacy of 1,1,1-trichloroethane is not understood. The weakness is thought to be because of the number of chlorine atoms attached to a single carbon atom within the molecular structure of 1,1,1-trichloroethane. But whatever the explanation, the above described deficiency has deterred commercial usage of the solvent. A significant need therefore exists for stabilized chlorinated hydrocarbon compositions, particularly those suitable for the elevated temperature treatment of iron, copper, aluminum and other easily corroded metals.

It is accordingly the object of this invention to provide stabilized compositions which are highly effective for the liquid and vapor phase degreasing of aluminum, iron, copper and other metals. A particular object is to provide chlorinated hydrocarbon solvent systems which retain chemical passivity during repeated cycles of exposure to metals at processing conditions. It is an even more particular object to provide a stabilized 1,1,1-trichloroethane solvent system of the latter type. A further object is to provide additive compositions especially adapted for use in chlorinated hydrocarbons, especially 1,1,1-trichloroethane, as stabilizers therefor. Other objects will appear hereinafter.

The present invention is a solvent composition comprising a chlorinated hydrocarbon solvent having dissolved therein a minor and stabilizing amount of a mixture of a nitroaliphatic compound, having the general formula RNO₂ as hereinafter defined, and a dioxolane type compound, having the general formula

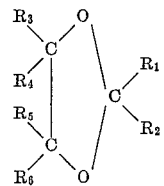

wherein R₁, R₂, R₃, R₄, R₅ and R₆ are the same or different and are selected from a group consisting of hydrogen and methyl and ethyl hydrocarbon radicals and wherein not more than two of the R₁, R₂, R₃, R₄, R₅ and R₆ components are hydrocarbon radicals. R represents hydrocarbon radicals selected from a group consisting of alkyl, isoalkyl, alkenyl, isoalkenyl, alkynyl, and isoalkynyl hydrocarbon radicals. Specifically, the nitroaliphatic compound includes nitromethane, nitroethane, nitroethylene, nitroacetylene, 2-nitropropane, 1-nitropropylene, 2-nitro-1-propene, 1-nitro-2-propyne, etc.; compounds of the dioxolane type include 1,3-dioxolane, 2,2-dimethyl-1,3-dioxolane, 2-methyl-1,3-dioxolane, 2,2-diethyl-1,3-dioxolane, 2-ethyl-1,3-dioxolane, 2,4-dimethyl-1,3-dioxolane, 2-methyl-4-ethyl-1,3-dioxolane, 5,5-dimethyl-1,3-dioxolane, 4,4-diethyl-1,3-dioxolane, 4-methyl-5-ethyl-1,3-dioxolane, 2-ethyl-5-methyl-1,3-dioxolane, etc.

According to a particularly preferred embodiment of this invention, the nitroaliphatic and dioxolane compounds are blended together to form additive concentrates or corrosion inhibitor compositions. These compositions are homogenous and essentially colorless solutions which can be rapidly and easily blended with chlorinated hydrocarbons to all desired concentrations. Furthermore, the compositions of this invention have superior storage and shipping characteristics—especially from the safety standpoint—as compared to the corresponding characteristics of the nitro-aliphatic ingredients thereof. The inhibited chlorinated hydrocarbon solvent compositions formed from the above additive combinations are highly resistant both to decomposition of the solvent and to corrosion of the metals with which the solvents are placed in contact. In particular, these additive concentrates when blended with chlorinated hydrocarbon solvents form highly useful compositions for degreasing the surfaces of metals. Accordingly, another preferred embodiment of the invention is an improvement in a degreasing process wherein 1,1,1-trichloroethane is contacted with metal, the improvement being to maintain a mixture of a nitro-aliphatic compound and a 1,3-dioxolane compound dissolved within the chlorinated hydrocarbon degreasing solvent during the process.

In an especially preferred embodiment, sufficient quantities of the stabilizing mixtures, composed of a nitroaliphatic and a dioxolane compound, (and even more particularly nitromethane and 1,3-dioxolane) are added to 1,1,1-trichloroethane to form compositions which are inhibited against metal-induced decomposition. These inhibited compositions are used to degrease the surfaces of metals by contacting the metals therewith.

In an even more especially preferred embodiment sufficient quantities of the stabilizing mixtures, composed of the nitro-aliphatic and dioxolane compounds, (and even more particularly nitromethane and 1,3-dioxolane) are added to 1,1,1-trichloroethane to form compositions, the liquids and vapors of which are inhibited against metal-induced decomposition under metal degreasing conditions. Thus, these stabilized compositions are particularly useful in degreasing processes wherein 1,1,1-trichloroethane vapor, in equilibrium with liquid 1,1,1-trichloroethane, is contacted with the surfaces of metals.

In accordance with the practice of this invention, chlorinated hydrocarbons are provided with additive concentrates or corrosion inhibitor compositions comprising mixtures of from about 10 percent to about 90 percent of a nitroaliphatic compound and from about 10 to about 90 percent of a dioxolane compound, based on the total weight of the corrosion inhibitor composition. Thus, the stabilizing component present in least quantity (where quantities are not equal) is present in at least about 10 percent by weight, based on the total weight of the stabilizing mixture of inhibitors. The balance is essentially the other component of the stabilizer combination.

Because of the its excellent power to inhibit chlorinated hydrocarbons, especially 1,1,1-trichloroethane, even in the vapor phase and because of its low cost-effectiveness a highly suitable corrosion inhibitor composition is one comprising from about 10 percent to about 90 percent nitromethane, and from about 10 percent to about 90 percent of 1,3-dioxolane, based on the total weight of the corrosion inhibitor composition.

These additive concentrates, or inhibiting compositions consisting essentially of mixtures of nitroaliphatic and dioxolane compounds when added to chlorinated hydrocarbon solvents, even in very minor quantities, form highly stable solvent compositions, which are highly beneficial for the liquid and vapor degreasing of iron, copper, aluminum and other metals. Not only are each of the components of the inhibiting compositions in themselves beneficial as stabilizers but also that the stabilizer pair produces far greater benefits than can be attributed to the use of either compound alone. This multifold benefit is greatly unexpected. An especially highly preferred stabilized composition of this type is 1,1,1-trichloroethane containing an inhibiting amount of a stabilizer pair consisting of nitromethane and 1,3-dioxolane. Generally, it is required that the quantity of either component (nitroaliphatic or dioxolane) within the stabilizing mixture should be present in at least about 10 percent by weight of the compound which is used in the highest concentration. The sum total weight of the mixture of stabilizers used in any given chlorinated hydrocarbon solvent should be between about 0.3 and 12 weight percent of the solvent composition employed. Good results can be obtained when about 1 to about 4 percent by weight of a mixture of the above said two components are present in the chlorinated hydrocarbon solvent. Preferably, a weight concentration of the sum total, or mixture, of the stabilizing components is about 2 percent of the weight of the solvent employed. Generally, the individual components can be mixed together in substantially equal volumetric amounts and added to the chlorinated hydrocarbon solvents and excellent results obtained. A very satisfactory 1,1,1-trichloroethane composition is formed by adding equal volumetric amounts of nitromethane and 1,3-dioxolane thereto, which corresponds to 0.21 weight percent nitromethane and about 0.20 weight percent 1,3-dioxolane. This particular combination has a stabilizing effect which far surpasses the stabilizing aspects of either of these components used individually.

The particular combinations of stabilizers heretofore stated are very effective with various chlorinated hydrocarbon solvents. Illustrative of these are carbon tetrachloride, ethylene dichloride, trichloroethylene, perchloroethylene, and in particular methyl chloroform or 1,1,1-trichloroethane.

As indicated above, stabilized liquid compositions of the present invention show little or no tendency to attack metals even at boiling conditions. The stabilized liquid can be stored for considerable periods of time, usually for months, in contact with aluminum, iron, copper and various metals, or alloys thereof, without significant decomposition. Also, vapors evolved from many of the stabilized liquid compositions show no tendency to attack metals. This makes many of the present solvent compositions highly effective for vapor phase degreasing operations.

For vapor degreasing applications, it is essential that the 1,1,1-trichloroethane composition be not only stable in the liquid state but also that it be susceptible to vaporizing and condensing with full retention of stability. This can be accomplished if an inhibitor has sufficient volatility to be carried into the vapor space in sufficient quantities to stabilize the latter without unduly depleting the liquid phase. In the instant case the stabilizers named provide excellent vapor phase inhibitors from the standpoint of volatility because the concentration of the additives in the vapor phase is very high in relation to their concentration in the liquid phase over a considerable concentration range, beyond the concentration thereof in a chlorinated hydrocarbon solvent necessary for effective stabilization, as hereinafter expressed.

The following examples demonstrate the effectiveness of stabilized chlorinated hydrocarbon solvents, particularly 1,1,1-trichloroethane solvent in the liquid and vapor phase even at threshold conditions. In each of the demonstrations tared polished strips of aluminum, iron and copper metals were placed in glass flasks. The lower ends of the strips were immersed in the liquid and the upper end exposed only to the vapors. The strips were exposed to the boiling solvent for one and one-half hours and at the end of this time were dried and reweighed. Corrosion is measured by the observed loss of weight of the individual metal strips.

The following example demonstrates the benefits derived from a stabilized 1,1,1-trichloroethane composition, or more specifically, such solvent stabilized with an inhibiting amount of a mixture of a nitroaliphatic compound and a dioxolane compound.

EXAMPLE I

A series of three runs was performed as shown in the table below. Metallic strips of iron, copper and aluminum were subjected to refluxing conditions for one and one-half hours, at ambient pressure. The weight percentages of the stabilizers present, based on the weight of the 1,1,1-trichloroethane solvent, is shown in the first columns opposite the particular run or demonstration. The weight percent loss, based on the original weight of the particular metallic strip as contrasted with its final weight at the end of the demonstration, is shown for each of the metals in the next series of columns. Run 1 reflects the advantages derived from the use of nitromethane used alone to stabilize 1,1,1-trichloroethane, and run 2 demonstrates the advantages obtained by the use of 1,3-dioxolane alone. Run 3 demonstrates the results provided by using a mixture of nitromethane and 1,3-dioxolane. Thus, the advantages derived from the use of this mixture to stabilize 1,1,1-trichloroethane against iron metal is roughly 20-fold over the use of nitromethane alone and 3-fold over the use of 1,3-dioxolane alone. For copper, the advantages derived from the use of the mixture is only a little less than 2-fold over the use of either component alone. The results of the use of this mixture with metallic aluminum are very impressive. Thus, it is seen that the use of the mixture is in excess of 30-fold over the use of nitromethane alone and approximately 18-fold over the advantages derived from the use of 1,3-dioxolane alone.

Table I

| Run | Weight Concentration of Components Added | | | Weight Percent Loss of Metal Strip | | |
|---|---|---|---|---|---|---|
| | Nitromethane | 1,3-Dioxolane | Total Concentration | Iron | Copper | Aluminum |
| 1 | 0.51 | 0.0 | 0.51 | 0.49 | 0.055 | 2.7 |
| 2 | 0.00 | 0.40 | 0.40 | 0.063 | 0.061 | 1.6 |
| 3 | 0.21 | 0.20 | 0.41 | 0.023 | 0.033 | 0.088 |

The following example demonstrates a stabilized solvent composition of the same type as used in the foregoing example except that in this instance a higher concentration of the stabilizing mixture of nitromethane and 1,3-dioxolane is used.

EXAMPLE II

The foregoing example is repeated in all details except that in this instance a 2 weight percent concentration of the mixture of nitromethane and 1,3-dioxolane in 1,1,1-trichloroethane is used and the refluxing is conducted for a period of 12 hours. The stabilizing effect of the system, as evidenced by the time required for the metal strips to show any loss of weight, is far superior to the results obtained by the use of a lower weight composition of the mixture of stabilizers in the 1,1,1-trichloroethane solvent. The greatly superior advantage of the stabilizer pair, over the use of the individual components of the mixture, is again demonstrated as in the foregoing example.

EXAMPLE III

The foregoing example is again repeated except that in this instance a 5 weight percent solution of the mixture of nitromethane and 1,3-dioxolane in 1,1,1-trichloroethane is formed. The same superior results are again obtained over that of stabilized 1,1,1-trichloroethane solvent compositions wherein the stabilizing compounds are used individually.

Having demonstrated the advantages derived from the use of a mixture of a nitroaliphatic and a dioxolane compound wherein these compounds are represented by the member nitromethane and 1,3-dioxolane, the following examples show the use of other members of these classes of compounds in 1,1,1-trichloroethane.

EXAMPLE IV

All of the foregoing examples are again repeated except that in this instance nitroethane and 2-methyl-1,3-dioxolane are employed as the stabilizing mixture for 1,1,1-trichloroethane. Again, as in the foregoing, highly satisfactory results are obtained.

EXAMPLE V

Examples I through III are again repeated except that in this instance nitroacetylene and 2,2-diethyl-1,3-dioxolane are employed as the stabilizing mixture for 1,1,1-trichloroethane. Again, highly satisfactory results are obtained. The advantages are clearly superior over the use of either of these components individually to stabilize 1,1,1-trichloroethane.

EXAMPLE VI

Examples I through III are again repeated except that in this instance the stabilizing mixture consists of 2-nitropropane and 2-ethyl-5-methyl-1,3-dioxolane. Again, as in the foregoing examples, highly satisfactory results are obtained. The use of the mixture is better than the components used individually to stabilize 1,1,1-trichloroethane.

EXAMPLE VII

Examples I through III are again repeated except that in this instance the stabilizing mixture consists of 2-nitro-1-propene and 4,5-dimethyl-1,3-dioxolane. Again, as in the foregoing examples, highly beneficial results are obtained by the use of the mixture as contrasted with the use of either component used individually.

EXAMPLE VIII

Examples I through III are again repeated except that in this instance 1-nitro-2-propyne and 1,3-dioxolane are employed as the stabilizing mixture. Again, highly beneficial results are obtained by the use of this mixture, as contrasted with the use of the components individually.

EXAMPLE IX

Examples IV through VIII are again repeated except that in this instance the nitroaliphatic compound is replaced with nitromethane. Again, as in the foregoing examples, highly satisfactory results are obtained and the properties resulting from the use of the stabilizing mixtures are superior to those of the components used individually.

EXAMPLE X

All of the foregoing examples are again repeated except that in this instance the chlorinated hydrocarbon solvent stabilized is 1,1,2-trichloroethylene. A highly desirable stabilized solvent composition results, and one which is superior to that which results from the use of either of the components of the mixture used alone to stabilize the 1,1,2-trichloroethylene solvent.

EXAMPLE XI

Examples I through IX are again repeated except that in this instance the chlorinated hydrocarbon solvent which is stabilized is carbon tetrachloride, ethylene dichloride and perchloroethylene, respectively. Again, highly stable compositions result, these being superior to the stabilized compositions which result from the use of either of the components individually to stabilize the solvent.

The following examples demonstrate a variety of corrosion inhibitor compositions which are a preferred embodiment of the present invention. The various nitroaliphatic and dioxolane components of the corrosion inhibitor compositions and the weight percent of each component within the respective corrosion inhibitor composition is as shown in the following table.

Table II

| Example | Nitroaliphatic Compound | Dioxolane Compound |
|---|---|---|
| XII | 90 percent Nitroethylene | 10 percent 1,3-Dioxolane. |
| XIII | 80 percent Nitroacetylene | 20 percent 2-Methyl-1,3-dioxolane. |
| XIV | 70 percent 1-Nitropropane | 30 percent 2-Ethyl-1,3-dioxolane. |
| XV | 60 percent 1-Nitro-2-propene | 40 percent 2-Methyl-2-ethyl-1,3-dioxolane. |
| XVI | 50 percent 2-Nitropropane | 50 percent 2,2-Dimethyl-1,3-dioxolane. |
| XVII | 40 percent 2-Nitro-1-propene | 60 percent 2,2-Diethyl-1,3-dioxolane. |
| XVIII | 30 percent 2-Nitro-1-propyne | 70 percent 4-Methyl-1,3-dioxolane. |
| XIX | 20 percent Nitroethane | 80 percent 5-Ethyl-1,3-dioxolane. |
| XX | 10 percent Nitromethane | 90 percent 1,3-Dioxolane. |

The stabilizing mixtures or corrosion inhibitor compositions shown in Examples XII through XX, of the above table, are added to 1,1,1-trichloroethane to form stabilized 1,1,1-trichloroethane compositions. The corrosion inhibitor compositions are added to the 1,1,1-trichloroethane in sufficient quantity to form 0.3, 0.5, 1, 2, 4, 5, 10 and 12 weight percent compositions of the stabilizing mixtures in 1,1,1-trichloroethane.

The procedure described in Example I is repeated with each of these stabilized 1,1,1-trichloroethane compositions and as in Example I the solvents show little or no signs of decomposition. The metals also show little or no signs of chemical attack.

When this same procedure is repeated with the exception that the metals are completely immersed within the stabilized 1,1,1-trichloroethane solvent, similar results are obtained.

The corrosion inhibitor compositions of Examples XII through XX are added to 1,1,2-trichloroethane, carbon tetrachloride, ethylene dichloride, and perchloroethylene, respectively, in sufficient quantity to form 0.3, 0.5, 1, 2, 4, 5, 10 and 12 weight percent compositions of the stabilizing mixture in each of the respective chlorinated hydrocarbon solvents. The procedure described in Example I is then again repeated with each of these compositions. As in Example I the solvent compositions show little or no signs of decomposition and the metals are essentially unattacked.

It will be understood that certain minor modifications can be made in the above process without departing from the spirit and scope of the invention. For example, it will be understood that "metal" as used in the foregoing specification includes at least aluminum, iron and copper. It is also used generically to include the various alloys as well as the elemental metal. By "inhibiting amount" of the compounds is meant any amount thereof added to stabilize the various chlorinated hydrocarbon solvents against decomposition. A certain minimum concentration of the mixed stabilizers should be added to effectively stabilize the chlorinated hydrocarbon solvents, i.e., on the order of about a 0.3 percent weight concentration of the mixture based on the weight of the said stabilized solvent, though this can vary slightly with temperature and with the number and quantity of other materials present which tend to accelerate the reaction. The upper concentration limit of the mixed stabilizers in the chlorinated hydrocarbon solvents is even less critical, any concentration greater than the minimum concentration producing a stabilized solvent. Greater concentrations can be used quite successfully.

This application is a continuation-in-part of application Serial No. 776,672, filed November 28, 1958, now abandoned.

Having described the invention, what is claimed is:

1. A stable solvent composition for metal degreasing, comprising a chlorinated hydrocarbon composition having at least about 0.3 weight percent of a stabilizing mixture dissolved therein, sufficient to inhibit the composition against decomposition, said stabilizing mixture consisting essentially of a nitroaliphatic hydrocarbon compound and a dioxolane compound, said nitroaliphatic hydrocarbon compound having not more than 3 carbon atoms, and said dioxolane compound being a 1,3-dioxolane compound containing up to 2 alkyl substituents each having from 1 to 2 carbon atoms.

2. A stable solvent composition for metal degreasing, comprising a 1,1,1-trichloroethane composition having at least about 0.3 weight percent of a stabilizing mixture dissolved therein, sufficient to inhibit the composition against decomposition, said stabilizing mixture consisting essentially of a nitroaliphatic hydrocarbon compound and a dioxolane compound, said nitroaliphatic hydrocarbon compound having not more than 3 carbon atoms, and said dioxolane compound being a 1,3-dioxolane compound containing up to 2 alkyl substituents each having from 1 to 2 carbon atoms.

3. The composition of claim 2 wherein the nitroaliphatic compound is nitromethane.

4. The composition of claim 2 wherein the dioxolane compound is 1,3-dioxolane.

5. A stable solvent composition for metal degreasing, comprising a 1,1,2-trichloroethane composition having at least about 0.3 weight percent of a stabilizing mixture dissolved therein, sufficient to inhibit the composition against decomposition, said stabilizing mixture consisting essentially of a nitroaliphatic hydrocarbon compound and a dioxolane compound, said nitroaliphatic hydrocarbon compound having not more than 3 carbon atoms, and said dioxolane compound being a 1,3-dioxolane compound containing up to 2 alkyl substituents each having from 1 to 2 carbon atoms.

6. A stable solvent composition for metal degreasing, comprising a chlorinated hydrocarbon solvent selected from the group consisting of 1,1,1-trichloroethane, 1,1,2-trichloroethylene, 1,1,2-trichloroethane, carbon tetrachloride, ethylene dichloride and perchloroethylene, said chlorinated hydrocarbon solvent having at least about 0.3 weight percent of a stabilizing mixture dissolved therein, sufficient to inhibit the composition against decomposition, said stabilizing mixture consisting essentially of a nitroaliphatic hydrocarbon compound and a dioxolane compound, said nitroaliphatic hydrocarbon compound having not more than 3 carbon atoms, and said dioxolane compound being a 1,3-dioxolane compound containing up to 2 alkyl substituents each having from 1 to 2 carbon atoms.

7. A stable solvent composition for metal degreasing comprising 1,1,1-trichloroethane having dissolved therein from 1 to 4 weight percent of a mixture of nitromethane and 1,3-dioxolane.

8. The composition of claim 5 wherein the nitroaliphatic compound is nitromethane.

9. The composition of claim 5 wherein the dioxolane compound is 1,3-dioxolane.

10. A stable solvent composition for metal degreasing comprising 1,1,2-trichloroethylene having dissolved therein from 1 to 4 weight percent of a mixture of nitromethane and 1,3-dioxolane.

11. A chlorinated hydrocarbon solvent corrosion inhibitor composition composed of a mixture of from about 10 percent to about 90 percent of a nitroaliphatic hydrocarbon compound and from about 10 percent to about 90 percent of a dioxolane compound, based on the total weight of the corrosion inhibitor composition, said nitroaliphatic hydrocarbon compound having not more than 3 carbon atoms, and said dioxolane compound being a 1,3-dioxolane compound containing up to 2 alkyl substituents each having from 1 to 2 carbon atoms.

12. A corrosion inhibitor composition composed of a mixture of from about 10 percent to about 90 percent of nitromethane and the balance being essentially 1,3-dioxolane.

13. The composition of claim 1 wherein from about 0.3 to about 12 weight percent of the stabilizing mixture is dissolved within the chlorinated hydrocarbon.

14. The composition of claim 2 wherein from about 0.3 to about 12 weight percent of the stabilizing mixture is dissolved within the 1,1,1-trichloroethane.

15. The composition of claim 2 wherein the nitroaliphatic hydrocarbon compound is nitromethane and the dioxolane compound is 1,3-dioxolane.

16. The composition of claim 2 wherein from about 1 to about 4 weight percent of the stabilizing mixture is dissolved within the 1,1,1-trichloroethane.

17. The composition of claim 5 wherein from about 0.3 to about 12 weight percent of the stabilizing mixture is dissolved within the 1,1,2-trichloroethane.

18. The composition of claim 6 wherein from about 0.3 to about 12 weight percent of the stabilizing mixture is dissolved within the chlorinated hydrocarbon solvent.

References Cited in the file of this patent

UNITED STATES PATENTS

| | | |
|---|---|---|
| 2,371,645 | Aitchison et al. | Mar. 20, 1945 |
| 2,567,621 | Skeeters et al. | Sept. 11, 1951 |